(12) United States Patent
Song et al.

(10) Patent No.: US 11,643,202 B2
(45) Date of Patent: May 9, 2023

(54) DRONE WITH SEMI-RIGID STRUCTURE AND SELECTIVELY ACTUATED ARMS

(71) Applicant: Toyota Motor Engineering & Manufacturing North America, Inc., Plano, TX (US)

(72) Inventors: Yuyang Song, Ann Arbor, MI (US); Taehwa Lee, Ann Arbor, MI (US); Hideo Iizuka, Ann Arbor, MI (US); Umesh N. Gandhi, Farmington Hills, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 668 days.

(21) Appl. No.: 16/719,029

(22) Filed: Dec. 18, 2019

(65) Prior Publication Data

US 2021/0188428 A1    Jun. 24, 2021

(51) Int. Cl.
  *B64C 27/52*  (2006.01)
  *B64C 39/02*  (2023.01)
  *H01F 7/06*  (2006.01)
  *G08G 5/04*  (2006.01)
  *G06V 20/13*  (2022.01)

(52) U.S. Cl.
  CPC .......... *B64C 27/52* (2013.01); *B64C 39/024* (2013.01); *G06V 20/13* (2022.01); *G08G 5/045* (2013.01); *H01F 7/064* (2013.01); *B64C 2201/027* (2013.01)

(58) Field of Classification Search
  None
  See application file for complete search history.

(56) References Cited

U.S. PATENT DOCUMENTS

| | | | |
|---|---|---|---|
| 9,972,929 B2 | 5/2018 | Fernandes et al. | |
| 9,975,633 B1 | 5/2018 | Johnson et al. | |
| 10,023,307 B2 | 7/2018 | Deng et al. | |
| 10,099,786 B1 | 10/2018 | Bar-Zeev et al. | |
| 10,162,348 B1 * | 12/2018 | Scott | B64C 37/00 |
| 10,315,759 B2 * | 6/2019 | Nemovi | B64C 39/024 |
| 2011/0084174 A1 | 4/2011 | Hemmelgarn et al. | |

(Continued)

OTHER PUBLICATIONS

Blain, "Are flexible frames the future of crash-proof drones?" found at: https://newatlas.com/flexible-crash-proof-drone/48387/ (Mar. 14, 2017).

*Primary Examiner* — Yuen Wong
*Assistant Examiner* — Hongye Liang
(74) *Attorney, Agent, or Firm* — Christopher G. Darrow; Darrow Mustafa PC

(57) ABSTRACT

Systems, methods, and other embodiments described herein relate to a drone having selectively actuated arms. In one embodiment, a drone includes arms connected to a body. Individual ones of the arms have a first end and a second end with the first end forming a connection with the body. The drone further includes rotor units individually including a propeller attached to a motor and mounted to the second end of the individual ones of the arms. Additionally, actuator units are integrated with the arms. Individual ones of the actuator units include electromagnetic cells that when activated induce an electromagnetic motive force that flexes the arms.

20 Claims, 10 Drawing Sheets

(56) References Cited

U.S. PATENT DOCUMENTS

| | | | |
|---|---|---|---|
| 2013/0233998 A1* | 9/2013 | Bueter | F16F 7/116 |
| | | | 267/140.14 |
| 2017/0217562 A1 | 8/2017 | Schalla | |
| 2017/0217571 A1* | 8/2017 | Deng | B64C 25/10 |
| 2019/0077497 A1 | 3/2019 | Uhlig et al. | |
| 2019/0127066 A1 | 5/2019 | Tournet et al. | |

* cited by examiner

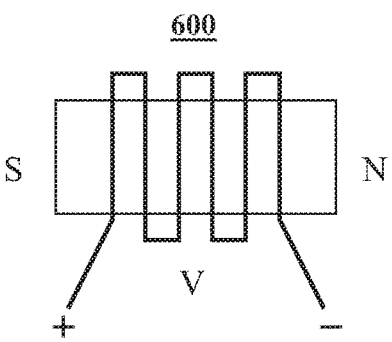 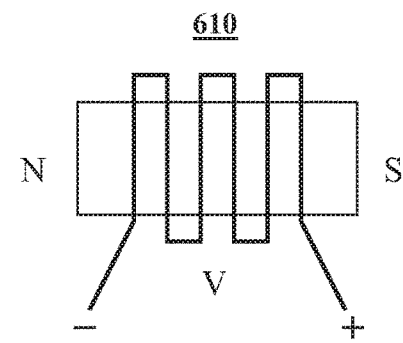
FIG. 6
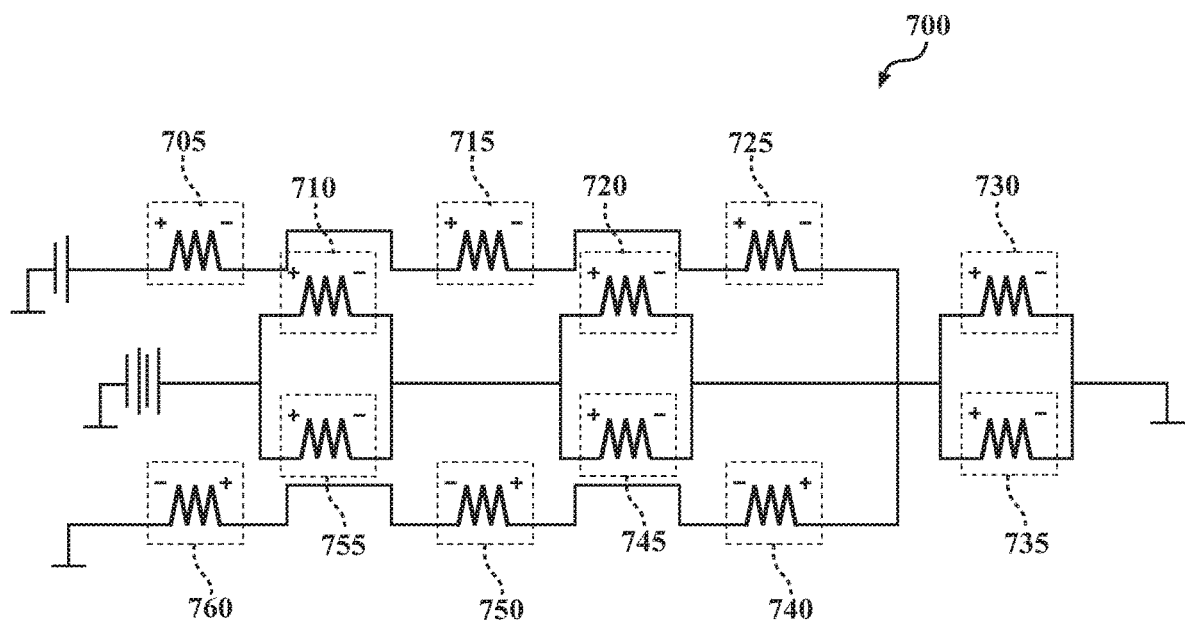
FIG. 7

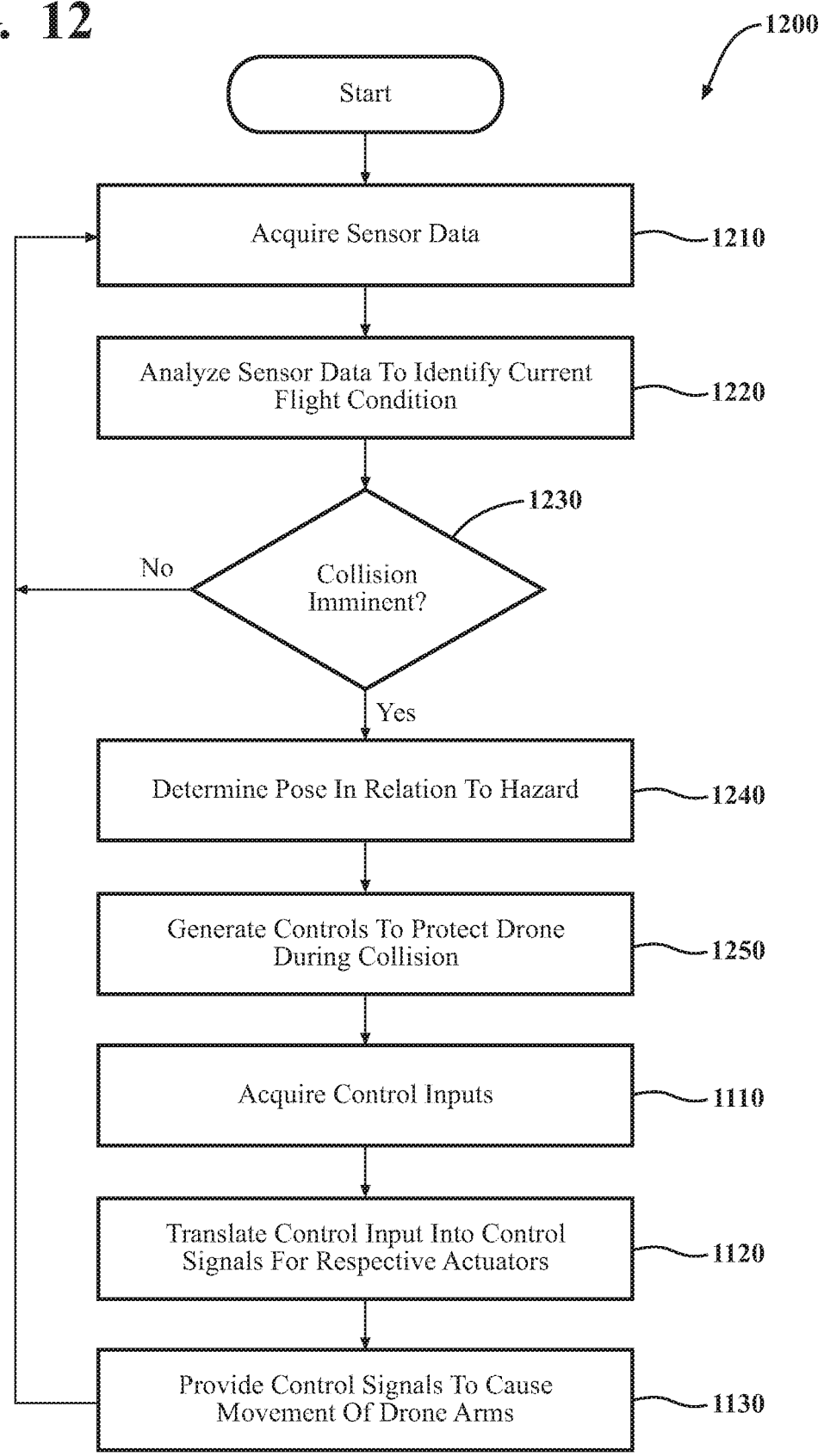

DRONE WITH SEMI-RIGID STRUCTURE AND SELECTIVELY ACTUATED ARMS

TECHNICAL FIELD

The subject matter described herein relates, in general, to drones, and, more particularly, to a configuration of a drone including electromagnetic actuators within arms of the drone that function to selectively flex semi-rigid structures of the arms thereby configuring the drone according to different circumstances during flight.

BACKGROUND

Drones (also referred to as unmanned aerial vehicles (UAVs)) can include many different forms of aircraft, and can serve many different functions. For example, multirotor helicopters are one type of drone. A multirotor helicopter may include multiple rotors (e.g., four rotors including propellers that generate lift, which is also referred to as a quadcopter) connected to a frame. In general, drones may be operated by using wireless controllers, or may include autonomous capabilities buttressed by one or more integrated processors that provide controls.

Moreover, the control of drones can be a difficult task. That is, smaller devices are prone to difficulties with stability due to weather (i.e., wind), construction of the drone (e.g., weight), and other aspects, while being expected to navigate with a high level of precision proximate to people, structures, and so on. Therefore, what is needed is a way to improve the maneuverability and robustness of drones.

SUMMARY

Example systems and methods disclosed herein relate to a drone having a semi-rigid arm structure with integrated electromagnetic-based actuators. For example, in one approach, the semi-rigid arm structure is an inflatable structure or other lightweight semi-rigid structure. Moreover, the individual arms include actuator units in one or more configurations. In one implementation, the arms include the actuator units in three distinct configurations. The configurations can include a first longitudinal configuration for inducing upward flexing/bending in the arms, a second longitudinal configuration for inducing downward flexing/bending in the arms, and a circumferential configuration to induce rotational flexing in the arms. Thus, in one or more approaches, a control system that is integrated with the drone can selectively activate the separate actuator units to cause the arms to flex in a desired configuration, thereby moving rotor units (e.g., propellers and motors) in relation to a body of the drone. Flexing the arms can function to maneuver the drone by altering directions of forces from the rotor units, and/or mitigating damage to the drone from a collision hazard (e.g., raising the rotor units away from the ground in a crash landing). In this way, the disclosed systems and methods avoid the noted difficulties and improve the functioning of the drone.

In one embodiment, a drone is disclosed. The drone includes a body, and arms connected to the body. Individual ones of the arms have a first end and a second end with the first end forming a connection with the body. The drone includes rotor units that individually include a propeller attached to a motor and mounted to the second end of the individual ones of the arms. The drone includes actuator units integrated with the arms, wherein individual ones of the actuator units include electromagnetic cells that when activated induce an electromagnetic motive force.

In one embodiment, a method for controlling a drone to avoid a collision is disclosed. In one embodiment, a method includes, in response to detecting a collision hazard from sensor data acquired about the surrounding environment by the drone, determining a pose in relation to the collision hazard. The method includes generating controls to position arms of the drone to mitigate impact with the collision hazard. The method includes actuating one or more actuating units integrated with the arms of the drone to position the arms. Actuating the one or more actuating units flexes one or more of the arms to reposition rotor units attached to the arms to avoid damage from the collision hazard.

In one embodiment, a drone is disclosed that includes a body, arms, rotor units, actuator units, and a control system. The arms are connected to the body with individual ones of the arms having a first end and a second end, the first end forming a connection with the body. The rotor units individually including a propeller attached to a motor and mounted to the second end of the individual ones of the arms. The actuator units are integrated with the arms. Individual ones of the actuator units include electromagnetic cells that when activated induce an electromagnetic motive force. The control system is operably connected with the actuator units and operable to selectively activate one or more of the actuator units to flex an associated one or more of the arms.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 6 is a schematic diagram of unit cells for actuator units.

FIG. 7 illustrates one embodiment of a bias circuit of an actuator unit.

FIG. 12 is a flowchart illustrating one embodiment of a method associated with improving collision avoidance of a drone.

DETAILED DESCRIPTION

Figure 1:
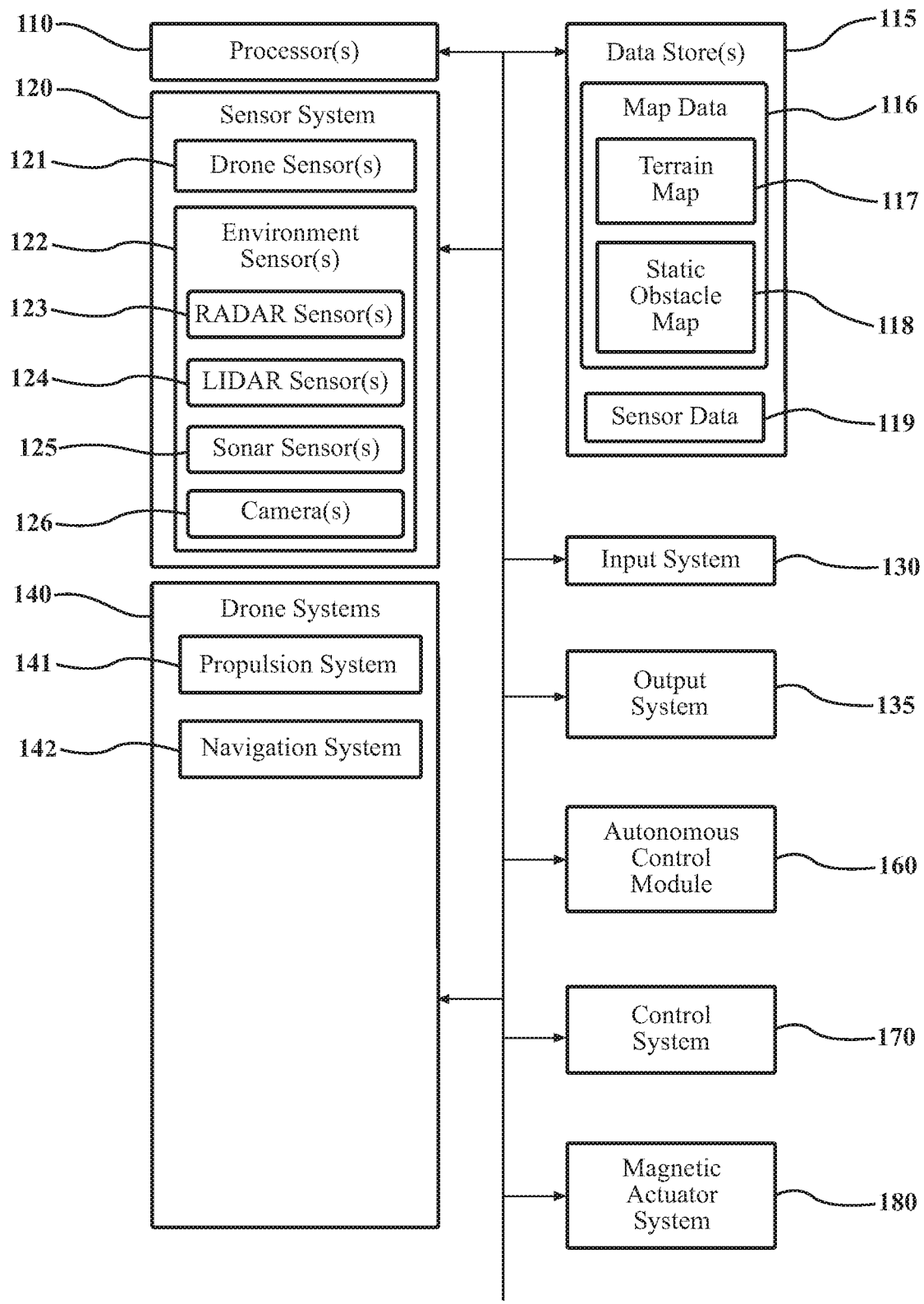
FIG. 1 illustrates one embodiment of systems that may be implemented as part of a drone.

Example systems and methods disclosed herein relate to a drone having a semi-rigid arm structure that includes electromagnetic-based actuators. As previously noted, difficulties can arise in regards to safely and accurately controlling a drone. For example, as drone designs evolve to include new ways of reducing weight and other modifications to a form of the drone, further mechanisms of action may result in new complexities in controlling the drone accurately. That is, for example, in the instance of a drone with inflatable arms or other lightweight arm structures on which rotor units are mounted, the arms may flex when the rotors are activated to provide lift. This flexing may cause irregularities in the flight of the drone. Moreover, because of the light weight of the drone, weather (e.g., wind) and other environmental factors may cause further irregularities. Additionally, such devices generally find use in close proximities (e.g., indoor environments, close surveying of buildings, etc.) to potential hazards, and even still are subject to damage from unforeseen hazards such as tree branches, utility wires, and other obstacles in the environment that can incapacitate a drone in the event of a collision.

Therefore, in one embodiment, a drone is disclosed having actuator units integrated within separate arms provides for further leveraging the flexibility of a semi-rigid construction of the arms to improve maneuverability and robustness against crashes. For example, in one approach, the semi-rigid arm structure is an inflatable structure or other lightweight semi-rigid structure. Moreover, the individual arms include actuator units in one or more configurations. In one implementation, the arms include the actuator units in three distinct configurations. The configurations can include a first longitudinal configuration for inducing upward flexing/bending in the arms, a second longitudinal configuration for inducing downward flexing/bending in the arms, and a circumferential configuration to induce rotational flexing in the arms. Thus, in one or more approaches, a control system that is integrated with the drone can selectively activate the separate actuator units to cause the arms to flex in a desired configuration, thereby moving rotor units (e.g., propellers and motors) in relation to a body of the drone. Flexing/bending the arms can function to maneuver the drone by directing forces from the rotor units, and/or mitigating damage to the drone from a collision hazard (e.g., raising the rotor units away from the ground in a crash landing). In various embodiments, the control system selectively activates the actuator units in different arms and/or configurations of the drone to achieve different responses by the drone in relation to maneuvering the drone and/or posing the drone in a particular configuration to avoid damage from crashing. In this way, the disclosed systems and methods avoid the noted difficulties and improve the functioning of the drone through further leveraging the semi-rigid structure of the drone.

Referring to FIG. 1, an example of a drone 100 is illustrated. As used herein, a "drone" is a powered unmanned aerial vehicle generally comprised of a body connected with at least two arms on which rotor units are mounted. Thus, the "drone" is generally a multi-rotor aircraft as provided for herein. In one or more implementations, the drone 100 is a quadcopter, i.e., a rotary aircraft having four separate rotors. While arrangements will be described herein with respect to quadcopters, it will be understood that embodiments are not limited to quadcopters. In some implementations, the drone 100 may be any multi-rotor UAV. As a further note, this disclosure generally discusses the drone 100 as traveling through space that is referred to as the surrounding environment of the drone 100. Thus, the surrounding environment is intended to be construed broadly as encompassing both indoor and outdoor environments including various other objects (e.g., buildings, vegetation, pedestrians) and vehicles (e.g., passenger vehicle, other aircraft, etc.) that may be encountered by the drone 100.

The drone 100 also includes various elements. It will be understood that in various embodiments, it may not be necessary for the drone 100 to have all of the elements shown in FIG. 1. The drone 100 can have any combination of the various elements shown in FIG. 1. Further, the drone 100 can have additional elements to those shown in FIG. 1. In some arrangements, the drone 100 may be implemented without one or more of the elements shown in FIG. 1. While the various elements are shown as being located within the drone 100 in FIG. 1, it will be understood that one or more of these elements can be located external to the drone 100. Further, the elements shown may be physically separated by large distances.

Some of the possible elements of the drone 100 are shown in FIG. 1 and will be described along with subsequent figures. However, a description of many of the elements in FIG. 1 will be provided after the discussion of FIGS. 2-12 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the drone 100 includes a control system 170 that is implemented to perform methods and other functions as disclosed herein relating to controlling arms of the drone to flex in defined configurations. The noted functions and methods will become more apparent with a further discussion of the figures. Moreover, the drone 100 includes a magnetic actuator system 180. In one embodiment, the magnetic actuator system 180 is comprised of a set of actuator units that function to flex arms of the drone 100 in different configurations depending on a particular implementation. In at least one approach, the magnetic actuator system 180 includes three sets of actuator units on each arm of the drone 100. Of course, in further implementations, the system 180 may include different arrangements of the actuator units, such as different arrangements on different arms of the drone 100, fewer sets on each arm, arms without actuator units, and so on. In any case, the control system 170 interfaces with the magnetic actuator system 180 to selectively activate actuator units to achieve a desired response in the flexing of the arms of the drone 100, as will be discussed in greater detail subsequently.

Figure 2:
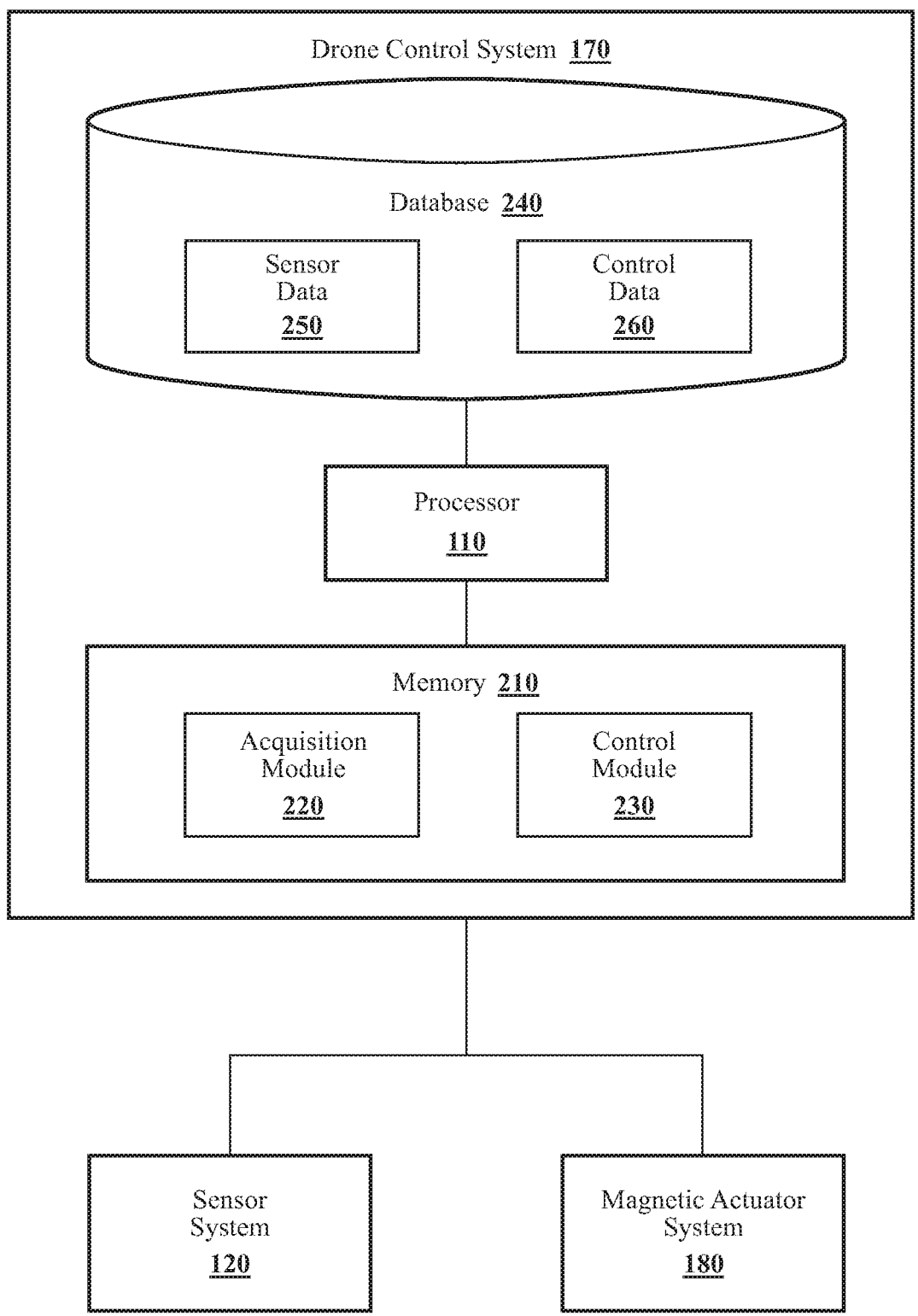
FIG. 2 illustrates one embodiment of a control system that is associated with selectively activating actuator units to control a drone.

With reference to FIG. 2, one embodiment of the control system 170 of FIG. 1 is further illustrated. The present disclosure will first discuss the overall configuration of the control system 170 before turning to the configuration of the drone 100. The control system 170 is shown as including a processor 110 from the drone 100 of FIG. 1. Accordingly, the processor 110 may be a part of the control system 170, the control system 170 may include a separate processor from the processor 110 of the drone 100 or the control system 170 may access the processor 110 through a data bus or another communication path. In one approach, the processor 110 is integrated with a flight controller, an electronic speed control (ESC), or another flight-related component of the drone 100.

In one embodiment, the control system 170 includes a memory 210 that stores an acquisition module 220 and a control module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that, when executed by the processor 110, cause the processor 110 to perform the various functions disclosed herein relating to coordinated control of the actuator units of the magnetic actuator system 180.

Accordingly, the acquisition module 220 generally includes instructions that function to control the processor 110 to receive or otherwise acquire data inputs from one or more sensors of the drone 100 that form sensor data 250, which embodies observations of the surrounding environment of the drone 100 including at least surrounding obstacles that may be present. The present discussion will focus on acquiring the sensor data 250 using various sensors that may be integrated with the drone 100 including, for example, a camera 126. However, it should be appreciated that the disclosed approach can be extended to cover further configurations of sensors such as LiDAR sensors with one or more cameras, different types of LiDARs and cameras, combinations of radars and cameras, sonar sensors, the use of a single sensor (e.g., camera), and so on.

Accordingly, the acquisition module 220, in one embodiment, controls the respective sensors to provide the data inputs in the form of the sensor data 250. Additionally, while the acquisition module 220 is discussed as controlling the various sensors to provide the sensor data 250, in one or more embodiments, the acquisition module 220 can employ other techniques to acquire the sensor data 250 that are either active or passive. For example, the acquisition module 220 may passively sniff the sensor data 250 from a stream of electronic information provided by the various sensors to further components within the drone 100. Moreover, as previously indicated, the acquisition module 220 can undertake various approaches to fuse data from multiple sensors when providing the sensor data 250. Thus, the sensor data 250, in one embodiment, represents a combination of measurements acquired from multiple sensors.

Additionally, the acquisition module 220, in one embodiment, controls the sensors to acquire the sensor data 250 about an area that encompasses 360 degrees about the drone 100 in order to provide a comprehensive assessment of the surrounding environment. Of course, in alternative embodiments, the acquisition module 220 may acquire the sensor data about a forward direction alone when, for example, the drone 100 is not equipped with further sensors to include additional regions and/or the additional regions are not scanned due to other reasons (e.g., unnecessary due to known current conditions).

Furthermore, in one embodiment, the control system 170 includes the data store 240. The data store 240 is, in one embodiment, an electronic data structure (e.g., a database) stored in the memory 210 or another memory/electronic storage and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes sensor data 250 and control data 260 along with, for example, other information that is used by the modules 220 and 230. The control data 260 includes, in one approach, a table or other mapping that correlates control inputs from, for example, a flight controller, a remote control, etc. into outputs used by the control system 170 to selectively activate actuator units to achieve desired maneuvers/configurations as will be discussed in greater detail subsequently.

The acquisition module 220, in one embodiment, is further configured to perform additional tasks beyond controlling the respective sensors to acquire and provide the sensor data 250. For example, the acquisition module 220 initially analyzes the sensor data 250 to distinguish between aspects of the surrounding environment (e.g., obstacles, etc.). In various approaches, the acquisition module 220 employs different object recognition techniques to identify aspects of the surroundings. The particular technique(s) employed to identify the surroundings may depend on available sensors within the drone 100, computational abilities (e.g., processor power) of the drone 100, and so on.

In one approach, the acquisition module 220 uses a machine-learning algorithm embedded within the acquisition module 220, such as a convolutional neural network (CNN), to perform semantic segmentation over the sensor data 250 from which the surrounding obstacles are identified and localized. Of course, in further aspects, the acquisition module 220 may employ different machine-learning algorithms or implements different approaches for performing the semantic segmentation, which can include deep convolutional encoder-decoder architectures, or another suitable approach that generates semantic labels for the separate object classes represented in the image. Whichever particular approach the acquisition module 220 implements, the acquisition module 220, in one or more embodiments, provides an output identifying the objects including potential hazards represented in the sensor data 250. In this way, the control system 170 distinguishes between objects in the surrounding environment and permits the system 170 to perform additional determinations about the separate objects.

Consequently, the acquisition module 220 is generally capable of identifying the surrounding objects/obstacles in order to acquire measurements about relative positions of the surrounding objects from the sensor data 250. Thus, by way of example, the acquisition module 220, in one approach, initially acquires the sensor data 250, fuses the sensor data 250 from multiple sensors (i.e., registers and combines information), identifies the surrounding objects within the sensor data 250, and then determines measurements to relative positions associated with the surrounding objects.

In any case, the acquisition module 220, in one or more approaches, can acquire and analyze the sensor data 250 in support of, for example, obstacle detection, crash mitigation, and/or other such systems that may be include in the drone 100, as will be discussed in greater detail in reference to the control module 230 subsequently. Briefly consider FIG. 3, which illustrates an overhead view of one example of the drone 100. As shown, the drone 100 includes a body 300 connected to four arms 310 (i.e., the arms 310*a, b, c*, and *d*). The arms 310 may be inflatable tubes and may be constructed from a variety of materials to form a semi-rigid structure. The materials that form the arms are, in one embodiment, a high-performance fabric, such as Dynema fabric CTS. In one embodiment, the fabric is, for example, a single layer having a thickness of about 0.1 mm. In further embodiments, other fabrics or materials that can form a semi-rigid structure (e.g., light-weight plastics) may be used. The arms 310 may each be approximately one foot in length and may have a diameter of approximately two inches. Of course, in further implementations, the arms and general dimensions of the drone 100 may be varied according to the defined ratios or according to other relationships. Note that while the arms 310 are illustrated and described as having a generally cylindrical shape, the embodiments are not limited to cylinders but may take other forms as the fabric or other material may be adapted to conform with when inflated. Other inflatable shapes and structures may be used in place of the arms 310. Additionally, inflation of the arms 310 may involve a one-time inflation process that pressurizes the arms 310 or an ongoing active pressurization process that uses, for example, dynamically controlled valves, a compressor, a reservoir of compressed air, and so on.

Each arm 310 may have a surface, a first end, and a second end. The first end (e.g., proximate end) of individual arms 310 are attached to the body 300 of the drone 100. The second end (e.g., distal end in relation to the body 300) of the individual arms 310 are attached to rotor units 320 (i.e., 320a, 320b, 320c, 320d). The separate rotor units 320 include, in one embodiment, at least an electric motor and a propeller attached thereto. In general, the rotor units 320 provide the lifting force that allows the drone 100 to fly in the air and also provide the directional forces that produce longitudinal and lateral movement. In various embodiments, some of the rotor units 320 may be configured to provide lift while others may be configured to provide longitudinal and lateral movement. In the example shown, the second end of the arm 310a is attached to the rotor unit 320a, the second end of the arm 310b is attached to the rotor unit 320b, the second end of the arm 310c is attached to the rotor unit 320c, and the second end of the arm 310d is attached to the rotor unit 320d. While only four arms 310 and rotor units 320 are shown, it is for illustrative purposes only; there is no limit to the number of arms 310 and rotor units 320 that may be supported. For example, other configurations of the drone 100 may include five, six, or more arms and associated rotor units.

The rotor units 320 may be electrically connected to the body 300 and components therein. The body 300 may house various components that provide for controlling the drone 100 (e.g., control the speed, direction, altitude, and rotation of the drone 100), such as flight controllers, IMUs, drone control system 170, etc. In one approach, the flight controllers may control the drone 100 by selectively adjusting the speed of each of the rotor units 320 relative to each other. As may be appreciated, because each of the arms 310 is, in one embodiment, inflatable, they may be caused to flex when certain maneuvers are performed. For example, when the drone 100 is performing the operation of increasing altitude in an upward direction perpendicular to the arms 310, each of the arms 310 may tend to bend upwards and inwards towards the body 110 as the rotor units 320 apply a lifting force to the second ends of the arms 310. This flexing of the arms 310 may lead to instability of the drone 100, and, in certain circumstances, may lessen the overall performance of the drone 100 thereby leading to potential difficulties with controlling and using the drone 100.

Figure 3:
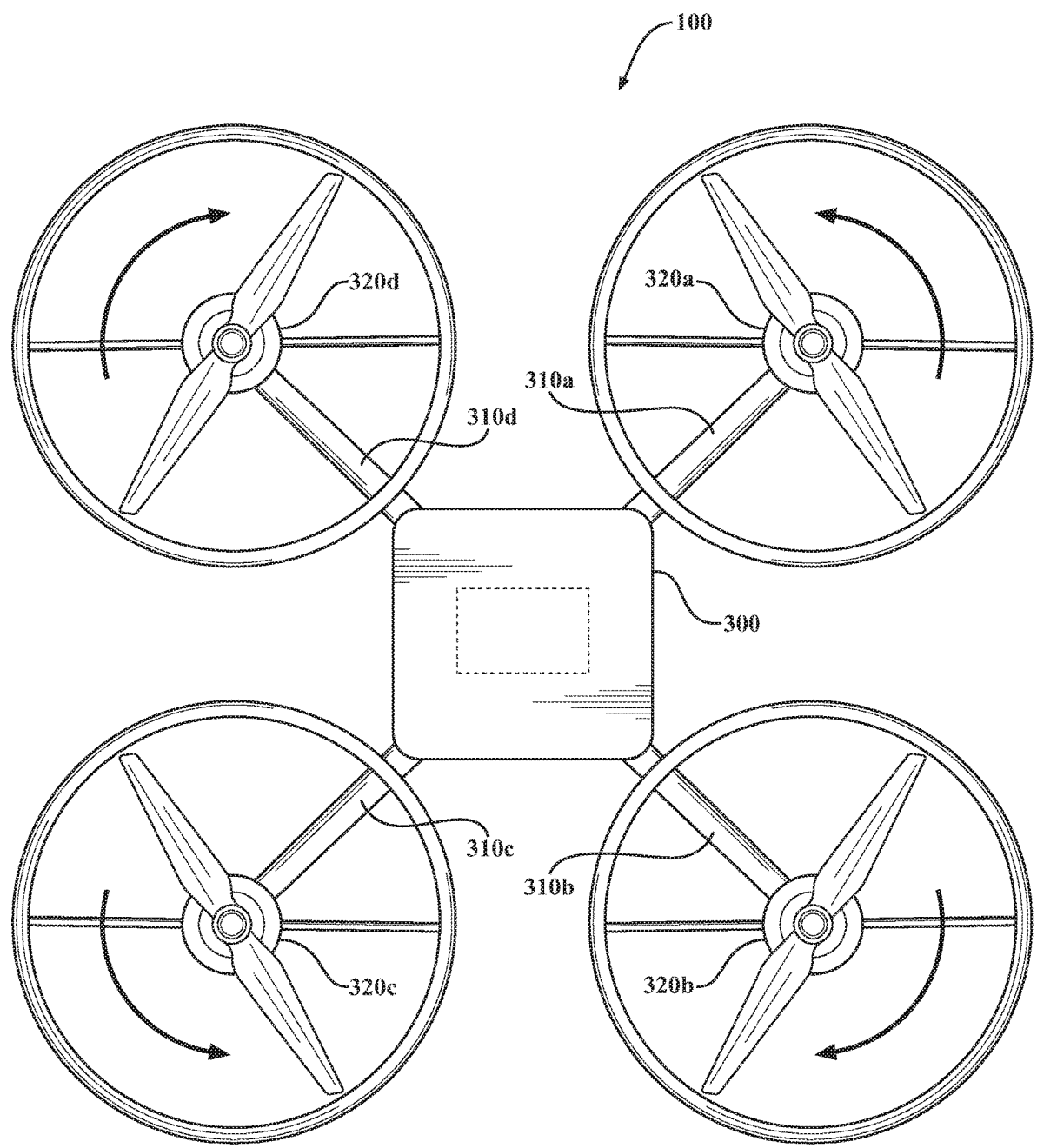
FIG. 3 is a diagram illustrating one example of a drone.
Figure 4:
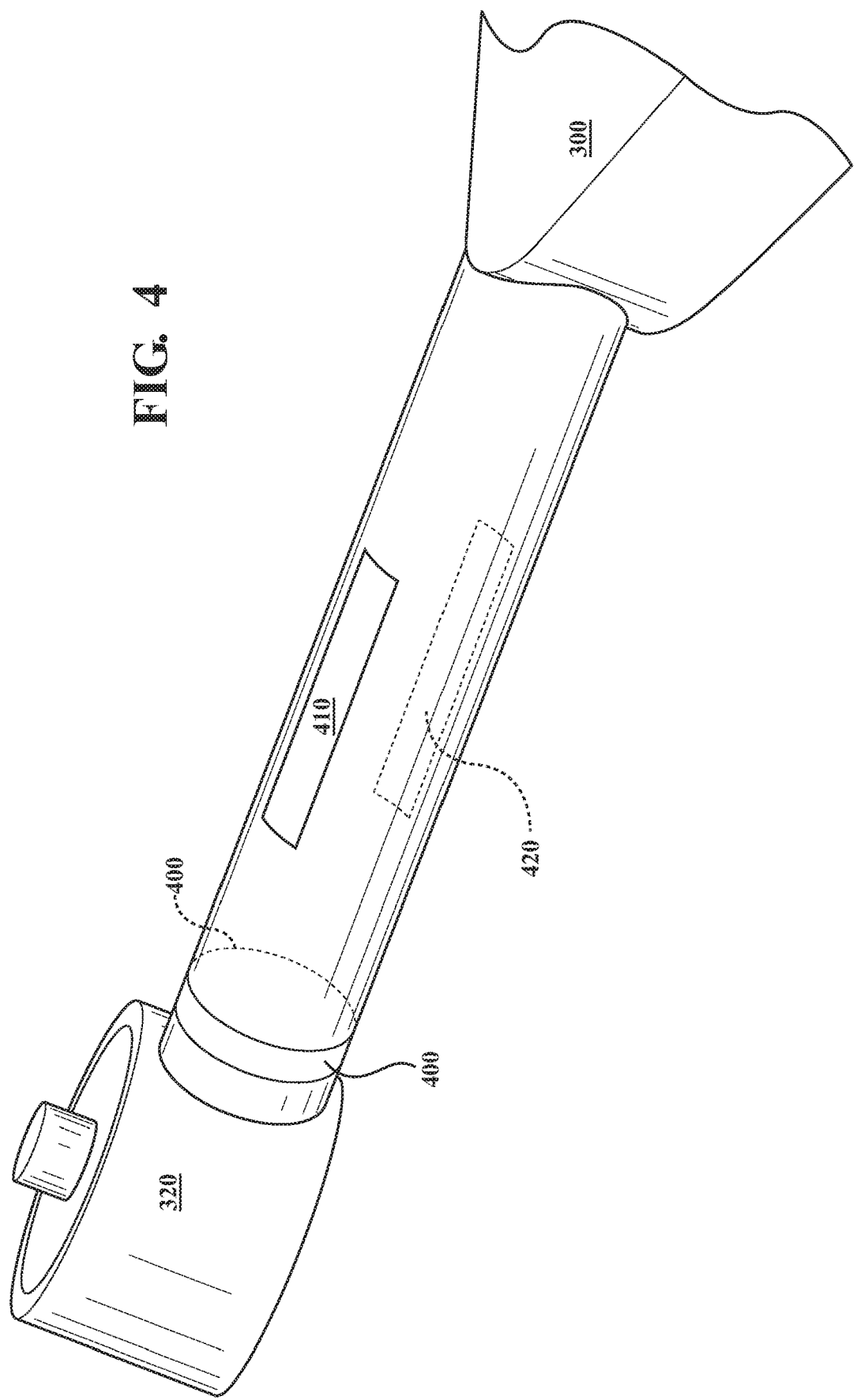
FIG. 4 is a diagram of an example arm of a drone including integrated actuator units.

FIG. 4 illustrates a more detailed view of an example of the arms 310 from FIG. 3. As illustrated, the arm 310 shows an illustrative arrangement of actuator units that are integrated with the arm 310. In various embodiments, the individual actuator units may be integrated with the arms 310 via application on top of the arms (e.g., an exterior), on an interior surface that forms a hollow space (i.e., a surface defining an interior inflated volume) of the arms 310, between layers of a material forming an inflatable shell of the arms, or in another suitable manner that provides sufficient contact between the actuator unit and a structure of the arm so that movement of the arm 310 is induced when the actuator units are activated.

In any case, as shown in FIG. 4, the arm 310a is illustrated as including three separate patches or sections of actuator units. Actuator unit 400 is a circumferential configuration that, when activated, induces rotation in the arm 310 so as to move the rotor unit 320 relative to the body 300. In one embodiment, the actuator unit 400 has a circumference of about 2.0 inches. However, in further approaches, the size of the actuator unit 400 may be varied according to a circumference of the arm 310a itself. Additionally, actuator units 410 and 420 are a pair forming either a first longitudinal configuration or a second longitudinal configuration, and may have a similar overall length as the actuator unit 400. Of course, in further approaches, the actuator units 410 and 420 may be a different length, such as a full length of the arm 310. The longitudinal configurations generally function in pairs with a first unit placed along a top surface of the arm and the second unit placed along a bottom surface. Additionally, the first unit and the second unit are generally configured in opposing manners to induce a common response in the arm 310. In the instance of the longitudinal configuration being arranged to induce an upward flexing of the arm 310, the actuator unit 410 is configured to cause a contraction along the arm 310 while the actuator unit 420 is configured to cause an expansion along the arm 310. By contrast, in an instance where the longitudinal configuration is to induce downward flexing, the configuration is reversed.

Furthermore, the arm 310 is shown with a single pair of actuator units 410 and 420, which may be statically configured to provide a single response (e.g., upward or downward bending). In further embodiments, the actuator units 410 and 420 may be selectively adapted to induce either response by, for example, implementing a multiplexor or other switching component that alternates a polarity of the voltage applied to individual cells in the units 410/420. In yet further aspects, the arms may include a first pair of actuator units that are configured to provide upward flexing and a second pair of actuator units that are configured to provide downward flexing.

Moreover, while not explicitly detailed herein, the longitudinal pair of actuator units may be placed in any opposing configuration at other locations on the arm 310 to induce flexing of the arm in a plane that is perpendicular to the pair. Thus, in one approach, the pair may be placed on opposing sides to induce side-to-side flexing of the arm 310. In yet further approaches, the placement of the pairs of actuator units may be selected to induce combined side and upward/downward flexing. In general, the arms 310 may be configured with a plurality of actuator units that are placed in order to provide movements in the arms 310 that facilitate the various functions disclosed herein. Thus, the example configuration is provided for purposes of brevity in this discussion, and it should be appreciated that the number and placement of the actuator units may vary according to different implementations and a desired fidelity of response in flexing of the arms.

Figure 5:
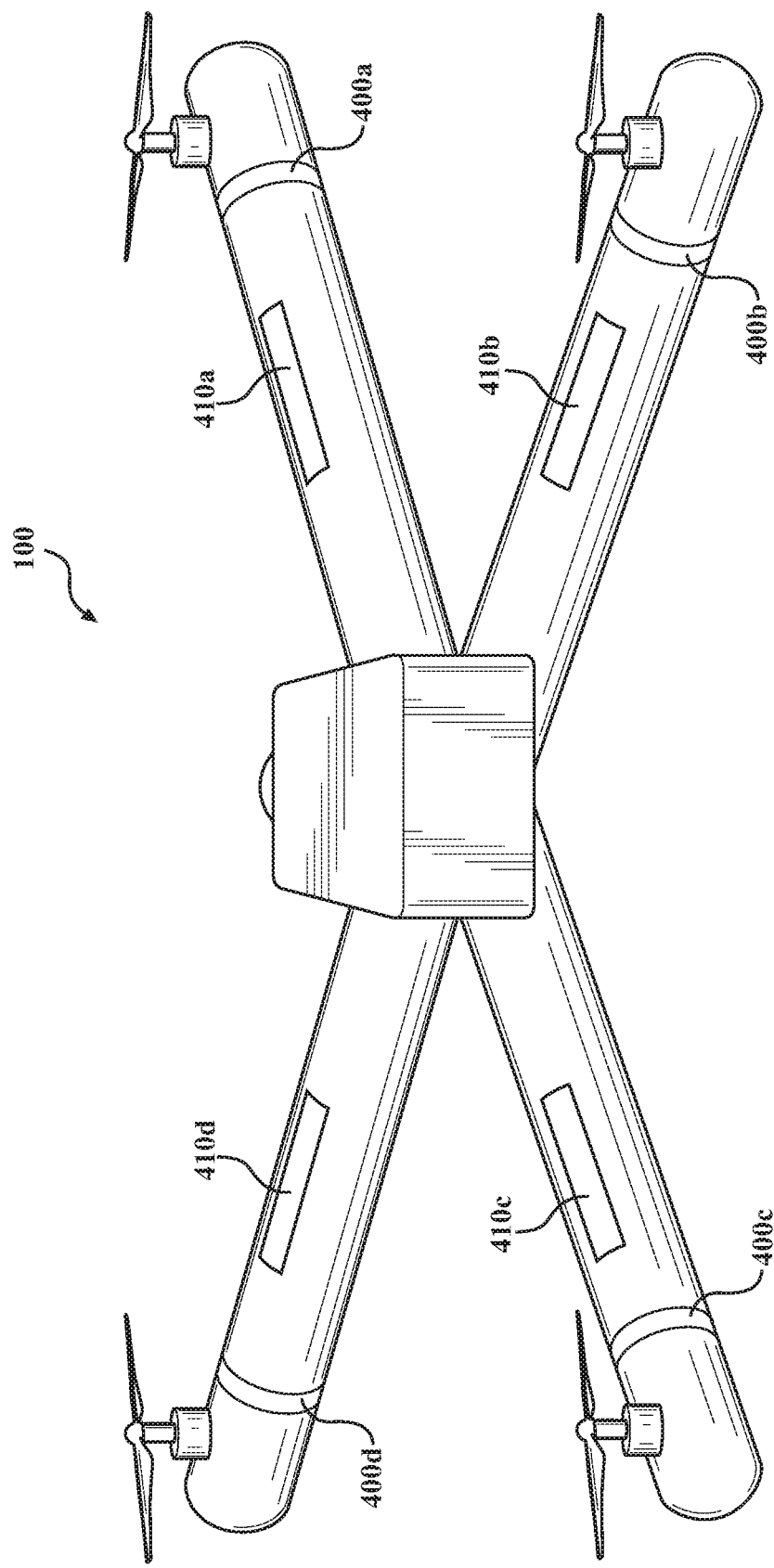
FIG. 5 is another diagram illustrating an example of a drone with further illustrations of actuator units.

As a further example before returning to FIG. 2, consider FIG. 5, which illustrates another view of the drone 100 that includes actuator units along the arms 310. As shown in FIG. 5, the drone 100 is fitted with actuator units 400a, 400b, 400c, and 400d having a circumferential configuration and actuator units 410a, 410b, 410c, and 410d having a longitudinal configuration. It should be appreciated that the opposing units to 410a-410d are obscured by the arms; however, in one or more embodiments, the actuator units 410a, 410b, 410c, and 410d may be provided without opposing units in the pairs. Moreover, while only one type of longitudinal actuator unit is shown, in further embodiments, additional types may be provided in combination.

As an example of electromagnetic cells that form the separate actuator units, consider FIG. 6. As shown in FIG. 6, two types of electromagnetic cells are illustrated. Electromagnetic cell 600 and cell 610. The different cells 600 and 610 are generally of a same overall configuration but are wired to have a differing polarity, as shown. In one example, the cells 600 and 610 include windings of wire around a conducting core (e.g., copper, iron, etc.). When a voltage is applied to the winding of wire, an electromagnetic field is induced within the cells according to the illustrated polarities. Turning to FIG. 7, a circuit diagram of one actuator unit pair 700 is illustrated in greater detail. As shown, the actuators 700 includes two sets of cells defining units that induce separate moments. The first set includes cells 705, 710, 715, 720, 725, and 730, whereas the second set includes cells 735, 740, 745, 750, 755, and 760. The first set is configured with opposing polarities in sequence such that when a voltage is applied to the circuit the sequence of cells are effectively pulled together. By contrast, the polarities of the second set are configured to cause the cells 735-760 to push apart when a voltage is applied by the drone control system 170. Thus, the illustrated circuit for the actuator unit pair 700 is, in one embodiment, distributed within an arm of the drone 100 to exert the noted forces on the upper and lower surfaces.

Figure 8:
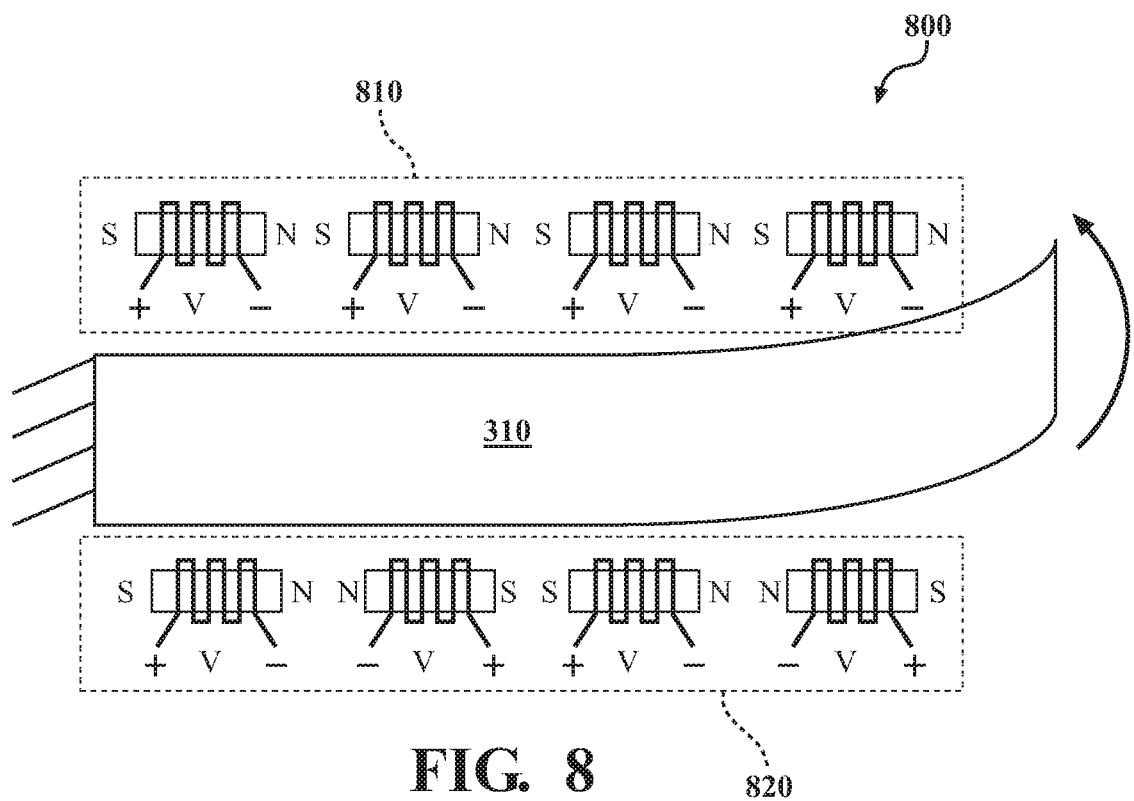
FIG. 8 illustrates one embodiment of a first longitudinal configuration of actuator units on an arm of a drone for inducing upward bending/flexing.
Figure 9:
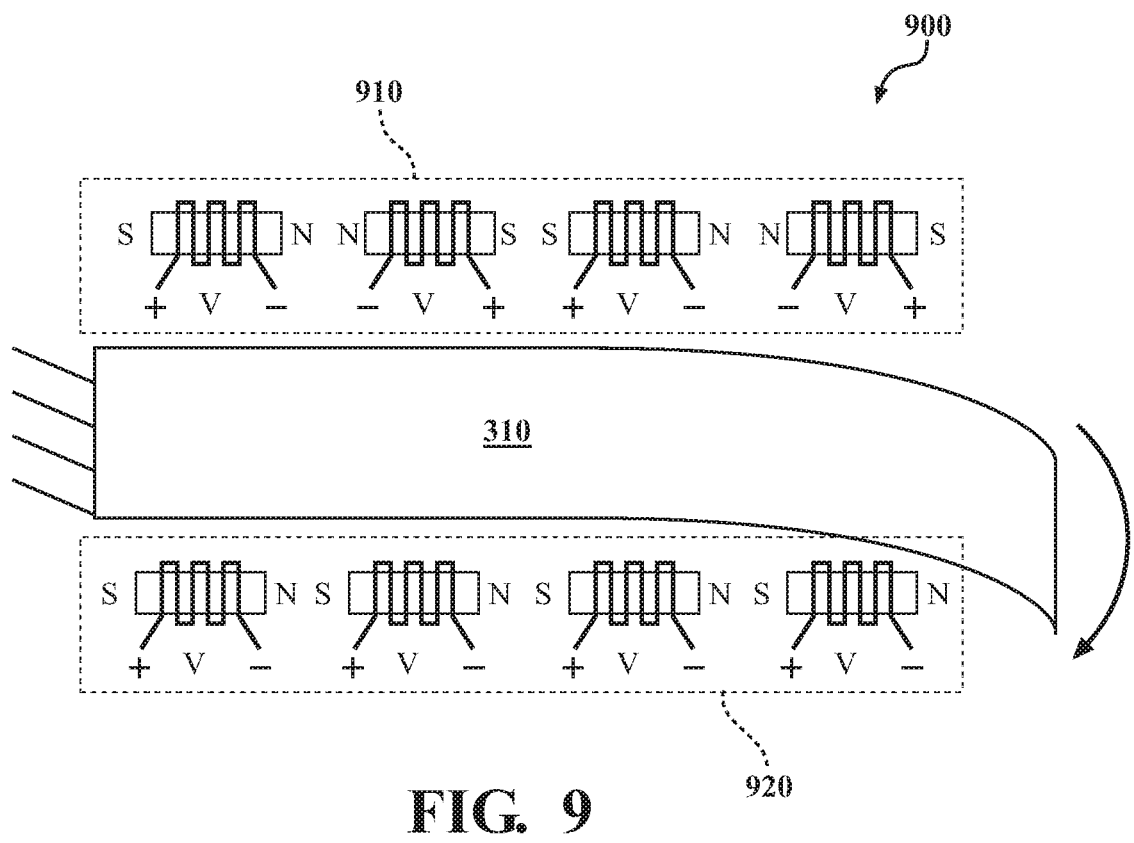
FIG. 9 illustrates one embodiment of a second longitudinal configuration of actuator units on an arm of a drone for inducing downward bending/flexing.
Figure 10:
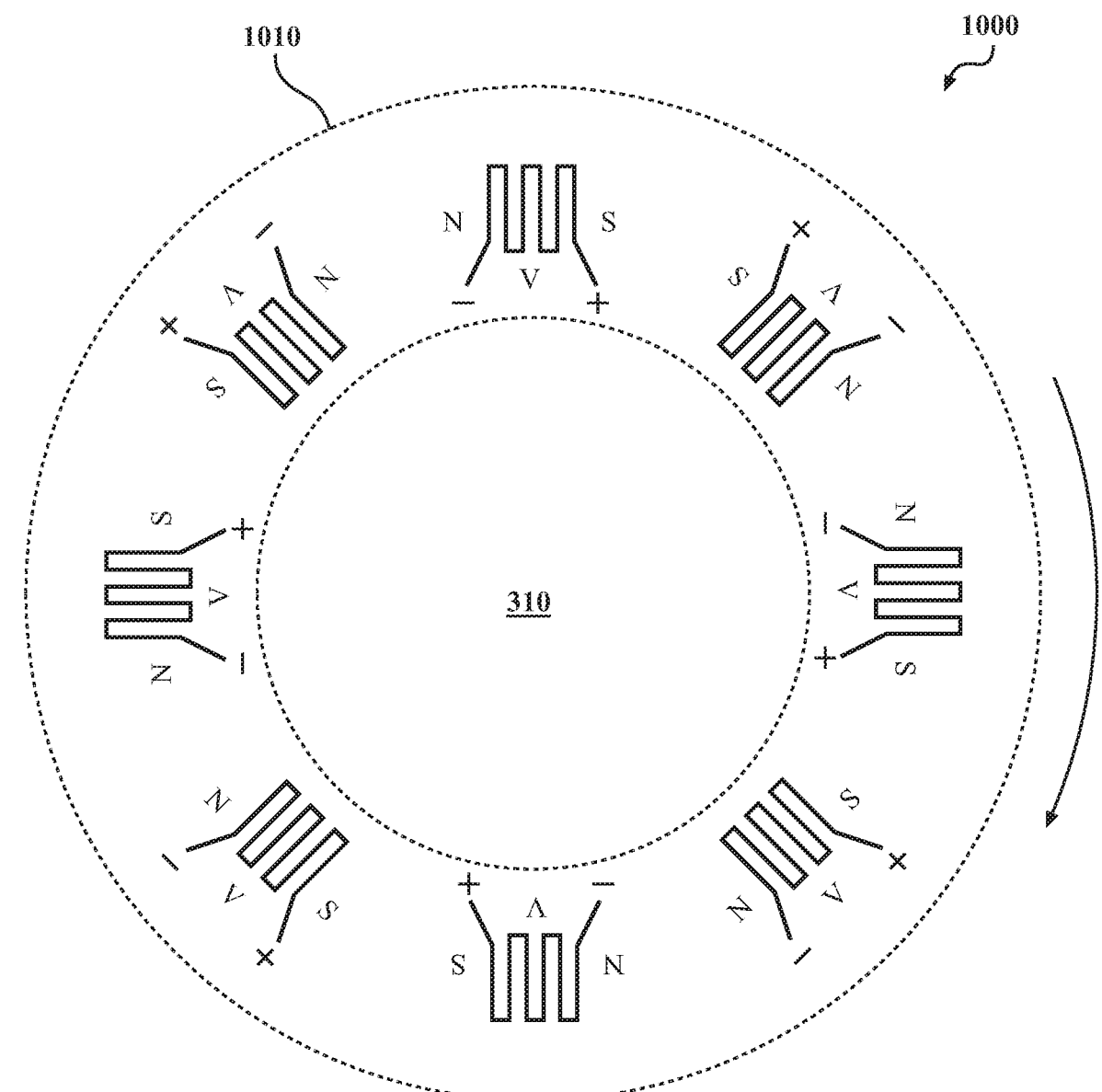
FIG. 10 illustrates one embodiment of a circumferential configuration of actuator units on an arm of a drone for inducing rotational bending/flexing.

As a further explanation, consider the diagrams illustrated in FIGS. 8-10. FIG. 8 illustrates a first longitudinal configuration 800 that is comprised of actuator units 810 and 820 integrated with one of the arms 310 of the drone 100. In the illustrated configuration, the cells of the actuator unit 810 are aligned with alternating polarities in succession such that, when activated, the cells are attracted together and pull the skin of the upper surface of the arm 310 together, thereby flexing the upper surface upward. By contrast, the actuator unit 820 includes cells with matching polarities in series such that, when activated, the cells are repelled and push the skin of the arm apart, thereby flexing the lower surface out and upward. A result of the two opposing actuators 810 and 820 is an upward flexing of the arm 310. It should be appreciated that while the actuator units 810 and 820 are discussed as inducing a flexing motion in the arm 310, the control system 170 can modify an extent of the flexing according to a voltage that is applied across the cells of the actuator units 810 and 820. That is, the actuator units 810 and 820 generate increased forces relative to the magnitude of the voltage applied therein. As such, the drone control system 170 can adapt the voltage level to induce different degrees of flexing in the arm 310. Of course, the flexing is generally controlled by at least two factors i) the force exerted by the actuators, and ii) the elasticity of the material forming the arm 310. In any case, the configuration of the actuator units 810/820 induce an upward bending in the arm while further configurations induce different directions of flexing.

For example, FIG. 9 illustrates a first longitudinal configuration 900 that is comprised of actuator units 910 and 920 integrated with one of the arms 310 of the drone 100. In the illustrated configuration, the cells of the actuator unit 920 are aligned with alternating polarities in succession such that, when activated, the cells are attracted together and pull the skin of the upper surface of the arm 310 together, thereby flexing the lower surface downward. By contrast, the actuator unit 910 includes cells with matching polarities in series, such that, when activated, the cells are repelled and push the skin of the arm apart, thereby flexing the upper surface out and downward. A result of the two opposing actuators 910 and 920 is a downward flexing of the arm 310.

Furthermore, FIG. 10 illustrates a cross-sectional view of one of the arms 310 that includes a plurality of cells of a circumferential configuration 1000 that is comprised of an actuator unit 1010 ringing the arm 310. The circumferential configuration 1000 includes cells with matching polarities aligned in series around the arm 310. Thus, when the actuator 1010 is activated, the cells are repelled and cause an angular moment that twists the arm 310. In this way, the control system 170 can not only flex the arms upward and downward, but can also rotate the arms in order to adjust a position of the rotor units and/or to protect the body of the drone against an impact. As will be discussed in greater detail with further reference to FIG. 2.

Accordingly, with further reference to FIG. 2, in one embodiment, the control module 230 generally includes instructions that function to control the processor 110 to execute various actions. For example, in one embodiment, the control module 230 acquires control inputs from an automated system and/or via electronic control inputs (e.g., manual control inputs) and selectively activates one or more of the actuator units of the actuator system 180 to achieve a desired maneuver. That is, for example, the controls may specify a simple or complex maneuver, and the control module 230 translates the inputs into selective activations of the actuator units in order to support the maneuver.

Thus, the control module 230, in one embodiment, uses a lookup table, a heuristic, or another mechanism to identify which actions of the actuator units facilitate control inputs to improve operation of the drone. By way of example, in an instance where the drone is to increase altitude and thus experiences an increased upward force from the rotor units to lift the drone 100, the control module 230 can cause the arms to flex downward thereby counteracting the lifting force in relation to any induced flexing in the structure of the drone 100.

In a further aspect, the control module 230 flexes the arms of the drone 100 to avoid damage from a collision hazard. For example, the control module 230 can analyze obstacles identified in the sensor data 250, and determine whether the obstacles represent collision hazards to the drone 100 (i.e., an imminent threat of impact/collision). The obstacles can be various aspects of the surrounding environment including surfaces (e.g., ground, walls, etc.), and various objects such as pedestrians, vehicles, utility wires, trees, etc. Accordingly, if the control module 230 determines that collision with the obstacle is imminent (e.g., a trajectory of the drone 100 and the obstacle intersect at a predicted future point in time) and cannot otherwise be avoided, the control module 230 then generates controls to position the arms of the drone to mitigate impact with the collision hazard. In one embodiment, the controls to position the arms include controls that selectively activate the actuator units to avoid damage.

By way of example, where the control module 230 determines that the drone 100 is falling toward the ground in an upright configuration, the control module 230 may flex the arms upward to prevent the rotor units from impacting the ground upon collision. In a further example, if the control module 230 identifies, for example, an oncoming obstacle such as a tree limb, the control module 230 can generate controls that flex an arm downward to facilitate avoiding contact between the tree limb and the rotor units. While modifications to the pose of the drone 100 through repositioning of the arms via the actuators flexing the arms does not necessarily avoid the collisions totally, the flexing can function to at least mitigate damage to the drone from direct impacts to sensitive components such as the rotor units, thereby improving the robustness of the drone 100 overall.

Figure 11:
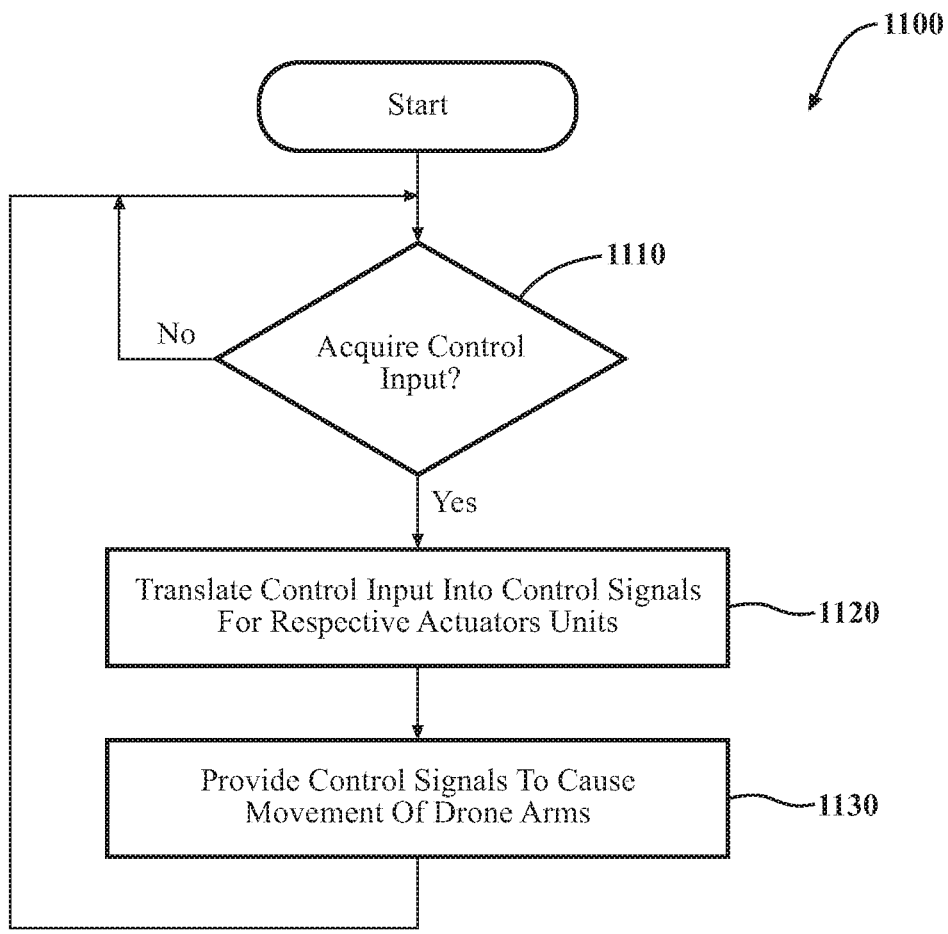
FIG. 11 is a flowchart illustrating one embodiment of a method associated with determining control for selectively activating actuator units on arms of a drone.

Additional aspects of improving the maneuverability of the drone 100 will be discussed in relation to FIG. 11. FIG. 11 illustrates a flowchart of a method 1100 that is associated with selectively activating actuator units integrated with arms of the drone 100 to improve maneuvering. The discussion of FIG. 11 is provided as a functional example of how the control system 170 may function to adapt control of the drone 100 in various circumstances. Method 1100 will be discussed from the perspective of the control system 170 of FIGS. 1, and 2, and the drone 100 of FIGS. 3-5. While method 1100 is discussed in combination with the control system 170, it should be appreciated that the method 1100 is not limited to being implemented within the control system 170 but is instead one example of a system that may implement the method 1100 to facilitate control of the drone 100.

At 1110, the drone control system 170 monitors for control inputs. In one embodiment, the control inputs are manual control inputs received via a transceiver that is in communication with a wireless controller that may be operated by a user. In further aspects, the control inputs are automated (e.g., stability control, automated leveling, etc.) and/or autonomous controls (i.e., UAV automated flight controls) that control the operation of the drone 100. In any case, the control system 170 functions as an intermediary between the controls and the actuator system 180 to translate the control inputs into activations of the actuator units that facilitate control.

At 1120, the control system 170 translates the control inputs into control signals to control selected actuator units according to the inputs. That is, because different control inputs may induce different responses in the arms 310 of the drone 100, the actuator units of the system 180 may be activated in different combinations to counter the control inputs. Thus, the system 170 may define a table that maps control inputs to actuator responses that facilitate maneuvers of the drone 100, such as opposing forces induced in the arms by the rotor units in order to maintain stability. Of course, in further aspects, the control system 170 acquires control inputs as part of internal collision hazard avoidance that functions to identify hazards and pose the arms of the drone 100 to avoid damage, as will be discussed in greater detail subsequently.

At 1130, the control system 170 provides the control signals to the actuator system 180 to cause the actuator units to activate selected ones of the actuator units. In one embodiment, the actuator system 180 provides a voltage at a specified level to induce a particular response to individual ones of the actuator units. Thus, the control signals generally specify which actuators are to be activated and an extent of activation (i.e., a degree of flex) for the respective actuators. In this way, the control system 170 can control the arms with a high degree of fidelity in order to improve maneuvers of the drone 100.

As an additional example of how the control system 170 may facilitate control of the drone 100 to avoid collision hazards, consider FIG. 12. FIG. 12 illustrates a flowchart of a method 1200 that is associated with selectively activating actuator units integrated with arms of the drone 100 to improve maneuvering. The discussion of FIG. 12 is provided as an additional example of how the control system 170 may function to identify hazards and control the drone 100 in various circumstances. Method 1200 will be discussed from the perspective of the control system 170 of FIGS. 1, and 2, and the drone 100 of FIGS. 3-5. While method 1200 is discussed in combination with the control system 170, it should be appreciated that the method 1200 is not limited to being implemented within the control system 170 but is instead one example of a system that may implement the method 1200 to facilitate collision avoidance of the drone 100.

At 1210, the acquisition module 220 controls the sensor system 120 to acquire the sensor data 250. In one embodiment, the acquisition module 220 controls at least the camera 126 of the drone 100 to observe the surrounding environment. Alternatively, or additionally, the acquisition module 220 controls the camera 126 and the radar 123 or another set of sensors to acquire the sensor data 250. As part of controlling the sensors to acquire the sensor data 250, it is generally understood that the sensors acquire the sensor data 250 of a region around the drone 100 with data acquired from different types of sensors generally overlapping in order to provide for a comprehensive sampling of the surrounding environment at each time step. In general, the sensor data 250 need not be of the exact same bounded region in the surrounding environment but should include a sufficient area of overlap such that distinct aspects of the area can be correlated. Thus, the acquisition module 220, in one embodiment, controls the sensors to acquire the sensor data 250 of the surrounding environment.

Moreover, in further embodiments, the acquisition module 220 controls the sensors to acquire the sensor data 250 at successive iterations or time steps. Thus, the control system 170, in one embodiment, iteratively executes the functions discussed at blocks 1210-1230 to acquire the sensor data 250 and provide information therefrom. Furthermore, the acquisition module 220, in one embodiment, executes one or more of the noted functions in parallel for separate observations in order to maintain updated perceptions. Additionally, as previously noted, the acquisition module 220, when acquiring data from multiple sensors, fuses the data together to form the sensor data 250 and to provide for improved determinations of detection, location, and so on.

At 1220, the acquisition module 220 analyzes the sensor data 250 to identify a current flight condition of the drone 100. In one embodiment, the acquisition module 220 applies, as previously noted, semantic segmentation or another object recognition/detection routine to the sensor data 250 in order to detect/identify the surrounding obstacles. Additionally, it should be appreciated that the systems and methods disclosed herein perform the noted tasks in parallel for a number "n" of surrounding obstacles that are detected, where "n" is an integer value greater than zero.

Of course, the acquisition module 220 may also identify further features in addition to the surrounding obstacles such as roads, buildings, curbs, sidewalks, signs, trees, utility wires, and so on. In this way, the control system 170 distinguishes between aspects of the surrounding environment to determine which aspects are potential collision hazards. Moreover, the acquisition module 220, in one approach, further determines a current trajectory of the drone 100 relative to the obstacles in order to assess the current flight condition of the drone 100. That is, the acquisition module 220 determines a current flight path of the drone 100 including a flight path due to any failures of the drone (e.g., rotor unit failure), and whether the flight path intersects with any obstacles. The acquisition module 220 may then label obstacles with which the drone 100 has an intersecting trajectory as potential collision hazards.

At 1230, the acquisition module 220 determines whether a collision with the identified collision hazards is imminent. In one embodiment, the acquisition module 220 considers collision to be imminent when, for example, the drone 100 cannot maneuver away from the hazard. Thus, when collision is imminent, the acquisition module 220 provides an indicator to the control module 230, which proceeds with the method 1200. Otherwise, the acquisition module 220 continues monitoring the surroundings for further hazards.

At 1240, the control module 230 determines a pose of the drone 100 in relation to the collision hazard. That is, the control module 230 determines a position of various aspects of the drone (e.g., the rotor units) relative to the collision hazard in order to assess whether particular portions of the drone 100 are at an increased risk of damage.

At 1250, the control module 230 generates controls to protect the drone 100 during a potential collision with the collision hazard. Thus, in one embodiment, the control module 230 generates the controls to flex the arms in a manner that positions the rotor units or other components in a configuration to avoid or better endure a collision. By way of example, the control module 230 may generate controls that flex the arms upward when the drone is losing altitude and is likely to collide with the ground. In a further example, the control module 230 may flex one or more arms away from an obstacle to avoid contact or minimize contact with the rotor units. It should be appreciated that the control module 230 may induce many different configurations of the arms that are designed to mitigate damage from collisions.

The controls from 1250 are then provided into the same process as outlined in relation to method 1100. That is, at 1110, the controls are provided as control inputs. At 1120, the control module 230 translates the control inputs into signals for the respective actuators, and, at 1130, the signals are provided to the actuators to induce movements of the arms. Moreover, in one or more embodiments, the movements of the arms may be combined with additional control of the rotor units to, for example, further flex one or more arms or otherwise maneuver the drone 100 to avoid a collision. In this way, the drone control system 100 functions to improve the maneuverability of the drone 100 in various circumstances by selectively activating the electromagnetic actuator units within the arms of the drone 100.

FIG. 1 will now be discussed in full detail as an example environment within which the system and methods disclosed herein may operate. In some instances, the drone 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the drone is performed according to inputs (e.g., electronically received from a user via an input device). In one or more arrangements, the drone 100 can be a conventional drone that is configured to operate in only a manual mode.

In one or more embodiments, the drone 100 is an unmanned aerial vehicle (UAV). As used herein, "UAV" refers to a vehicle that operates in an autonomous mode. "Autonomous mode" refers to navigating and/or maneuvering the drone 100 along a flight path using one or more computing systems to control the drone 100 with minimal or no input. In one or more embodiments, the drone 100 is highly automated or completely automated. In one embodiment, the drone 100 is configured with one or more semi-autonomous operational modes in which one or more computing systems perform a portion of the navigation and/or maneuvering of the drone 100 along a route, and an operator provides inputs to perform a portion of the navigation and/or maneuvering of the drone 100. Such a semi-autonomous operation can include supervisory control.

The drone 100 can include one or more processors 110. In one or more arrangements, the processor(s) 110 can be a main processor of the drone 100. For instance, the processor(s) 110 can be an electronic control unit (ECU). The drone 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, terrain, structures, features, and/or landmarks in the one or more geographic areas. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles/features located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the drone 100 is equipped with, including the capabilities and other information about such sensors. As will be explained below, the drone 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the drone 100. Alternatively, or in addition, at least a portion of the map data 116 and/or the sensor data 119 can be located in one or more data stores 115 that are located remotely from the drone 100.

As noted above, the drone 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the drone 100 (including any of the elements shown in FIG. 1). The sensor system 120 can acquire data of at least a portion of the external environment of the drone 100.

The sensor system 120 can include any suitable type of sensor. Various examples of different types of sensors will be described herein. However, it will be understood that the embodiments are not limited to the particular sensors described. The sensor system 120 can include one or more drone sensors 121. The drone sensor(s) 121 can detect, determine, and/or sense information about the drone 100 itself. In one or more arrangements, the drone sensor(s) 121 can be configured to detect, and/or sense position and orientation changes of the drone 100, such as, for example, based on inertial acceleration. In one or more arrangements, the drone sensor(s) 121 can include one or more accelerometers, one or more gyroscopes, an inertial measurement unit (IMU), a dead-reckoning system, a global navigation satellite system (GNSS), a global positioning system (GPS), a navigation system 142, and/or other suitable sensors. The drone sensor(s) 121 can be configured to detect, and/or sense one or more characteristics of the drone 100.

Alternatively, or in addition, the sensor system 120 can include one or more environment sensors 122 configured to acquire, and/or sense environment data. "Environment data" includes data or information about the external environment in which a UAV is located or one or more portions thereof. For example, the one or more environment sensors 122 can be configured to detect, quantify, and/or sense obstacles in at least a portion of the external environment of the drone 100 and/or information/data about such obstacles. Such obstacles may be stationary objects and/or dynamic objects. The one or more environment sensors 122 can be configured to detect, measure, quantify and/or sense other things in the external environment of the drone 100, such as, for example, pedestrians, trees/vegetation, utility wires/poles, buildings, vehicles, etc.

Various examples of sensors of the sensor system 120 will be described herein. The example sensors may be part of the one or more environment sensors 122 and/or the one or more sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The drone 100 can include an input system 130. An "input system" includes any device, component, system, element, or arrangement or groups thereof that enable information/data to be entered into a machine. The drone 100 can include an output system 135. An "output system" includes any device, component, or arrangement or groups thereof that enable information/data to be presented to a user via, for example, a wireless controller.

The drone 100 can include one or more drone systems 140. Various examples of the one or more drone systems 140 are shown in FIG. 1. However, the drone 100 can include more, fewer, or different systems. It should be appreciated that although particular systems are separately defined, each or any of the systems or portions thereof may be otherwise combined or segregated via hardware and/or software within the drone 100. The drone 100 can include a propulsion system 141 (e.g., rotor units), a navigation system 142, and/or other systems as may be implemented to facilitate the drone 100. Each of these systems can include one or more devices, components, and/or a combination thereof, now known or later developed.

The navigation system 142 can include one or more devices, applications, and/or combinations thereof, now known or later developed, configured to determine the geographic location of the drone 100 and/or to determine a travel route for the drone 100. The navigation system 142 can include one or more mapping applications to determine a travel route for the drone 100. The navigation system 142 can include a global positioning system, a local positioning system, or a geolocation system.

The processor(s) 110, the control system 170, and/or the autonomous control module(s) 160 can be operatively connected to communicate with the various drone systems 140 and/or individual components thereof. For example, returning to FIG. 1, the processor(s) 110 and/or the autonomous control module(s) 160 can be in communication to send and/or receive information from the various drone systems 140 to control the movement, speed, maneuvering, heading, direction, etc. of the drone 100. The processor(s) 110, the control system 170, and/or the autonomous control module(s) 160 may control some or all of these drone systems 140 and, thus, may be partially or fully autonomous.

The processor(s) 110, the control system 170, and/or the autonomous control module(s) 160 can be operatively connected to communicate with the various drone systems 140 and/or individual components thereof. For example, returning to FIG. 1, the processor(s) 110, the control system 170, and/or the autonomous control module(s) 160 can be in communication to send and/or receive information from the various drone systems 140 to control the movement, speed, maneuvering, heading, direction, etc. of the drone 100. The processor(s) 110, the control system 170, and/or the autonomous control module(s) 160 may control some or all of these drone systems 140.

The processor(s) 110, the control system 170, and/or the autonomous control module(s) 160 may be operable to control the navigation and/or maneuvering of the drone 100 by controlling one or more of the drone systems 140 and/or components thereof. For instance, when operating in an autonomous mode, the processor(s) 110, the control system 170, and/or the autonomous control module(s) 160 can control the direction and/or speed of the drone 100. The processor(s) 110, the control system 170, and/or the autonomous control module(s) 160 can cause the drone 100 to accelerate, decelerate, and/or change direction. As used herein, "cause" or "causing" means to make, force, direct, command, instruct, and/or enable an event or action to occur or at least be in a state where such event or action may occur, either in a direct or indirect manner.

The drone 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The drone 100 can include one or more autonomous control modules 160. The autonomous control module(s) 160 can be configured to receive data from the sensor system 120 and/or any other type of system capable of capturing information relating to the drone 100 and/or the external environment of the drone 100. In one or more arrangements, the autonomous control module(s) 160 can use such data to generate one or more models. The autonomous control module(s) 160 can determine the position and velocity of the drone 100. The autonomous control module(s) 160 can determine the location of obstacles, obstacles, or other environmental features including traffic signs, trees, shrubs, vehicles, pedestrians, etc.

The autonomous control module(s) 160 can be configured to receive, and/or determine location information for obstacles within the external environment of the drone 100 for use by the processor(s) 110, and/or one or more of the modules described herein to estimate position and orientation of the drone 100, position in global coordinates based on signals from a plurality of satellites, or any other data and/or signals that could be used to determine the current state of the drone 100 or determine the position of the drone 100 with respect to its environment for use in either creating a map or determining the position of the drone 100 in respect to map data.

The autonomous control module(s) 160 either independently or in combination with the control system 170 can be configured to determine travel path(s), current autonomous maneuvers for the drone 100, future autonomous maneuvers and/or modifications to current autonomous maneuvers based on data acquired by the sensor system 120, and/or data from any other suitable source such as determinations from the sensor data 250 as implemented by the control module 230. "Maneuver" means one or more actions that affect the movement of the drone 100. Examples of maneuvers include: accelerating, decelerating, slowing, turning, moving in a lateral direction of the drone 100, and/or reversing, just to name a few possibilities. The autonomous control module(s) 160 can be configured to implement determined maneuvers. The autonomous control module(s) 160 can cause, directly or indirectly, such autonomous maneuvers to be implemented. The autonomous control module(s) 160 can be configured to execute various functions and/or to transmit data to, receive data from, interact with, and/or control the drone 100 or one or more systems thereof (e.g., one or more of drone systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-12, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A drone comprising:
   a body;
   arms connected to the body, wherein individual ones of the arms have a first end and a second end, the first end forming a connection with the body, the arms being inflatable and bendable;
   rotor units individually including a propeller attached to a motor and mounted to the second end of the individual ones of the arms; and
   actuator units integrated with the arms, wherein individual ones of the actuator units include electromagnetic cells that when activated induce an electromagnetic motive force,
   wherein the electromagnetic cells are selectively activated by application of a voltage that induces the electromagnetic motive force to flex one or more of the arms in a defined direction according to a location and an arrangement of the actuator units along a surface of the arms, including flexing upward, flexing downward, and flexing one or more of the arms to rotate.

2. The drone of claim 1, wherein the arms have a semi-rigid construction.

3. The drone of claim 1, wherein the actuator units are separately integrated with the arms according to defined configurations that induce different responses by the arms when activated, and
   wherein the defined configurations include at least one of: a first longitudinal configuration that when activated induce the arms to flex upward, a second longitudinal configuration that when activated induce the arms to flex downward, and a circumferential configuration that when activated induce the arms to rotate.

4. The drone of claim 3, wherein individual ones of the arms include the actuator units according to the first longitudinal configuration, the second longitudinal configuration, and the circumferential configuration.

5. The drone of claim 3, wherein the first longitudinal configuration includes a first actuator unit of the actuator units aligned along a top surface of the individual ones of the arms and a second actuator unit of the actuator units aligned along a bottom surface of the individual ones of the arms, wherein the first actuator unit induces a contraction of the top surface and the second actuator unit causes expansion of the bottom surface to induce the arms to flex upward, wherein the second longitudinal configuration includes a third actuator unit of the actuator units aligned along a top surface of the individual ones of the arms and a fourth actuator unit of the actuator units aligned along a bottom surface of the individual ones of the arms, wherein the fourth actuator unit induces a contraction of the bottom surface and the third actuator unit causes expansion of the top surface to induce the arms to flex downward, and wherein the circumferential configuration includes a fifth actuator unit of the actuator units aligned along a circumference of the individual ones of the arms, and wherein the fifth actuator unit induces a twisting along the circumference that causes the individual ones of the arms to rotate.

6. The drone of claim 1, wherein the actuator units are comprised of bias circuits having electromagnetic units, the electromagnetic units have polarities, and the actuator units including contracting units that align opposing polarities between the electromagnetic units and expanding units that align matching polarities between the electromagnetic units.

7. The drone of claim 1, further comprising:
a control system operably connected with the actuator units and operable to selectively activate one or more of the actuator units to flex an associated one or more of the arms.

8. The drone of claim 7, wherein the control system selectively activates the one or more actuator units responsive to a control signal to control the drone to perform a maneuver.

9. The drone of claim 8, wherein the control signal identifies the maneuver as a change in altitude of the drone, a turn of the drone, or a rotation of the drone, and wherein the control system selectively activates one or more of the actuator units to cause the drone to perform the maneuver by flexing one or more of the arms.

10. The drone of claim 8, wherein the control system generates the control signal in response to identifying a collision event with an obstacle, and wherein the control system causes one or more of the arms to flex in a collision configuration that avoids impacting the rotor units with the obstacle.

11. The drone of claim 1, wherein the arms are comprised of tubes that are inflatable to form semi-rigid structures.

12. The drone of claim 1, where the arms include four arms, and the rotor units include four separate rotor units connected with the four arms.

13. A method of controlling a drone to avoid a collision, comprising:
in response to detecting a collision hazard from sensor data acquired about a surrounding environment by the drone, determining a pose in relation to the collision hazard;
generating controls to position arms of the drone to mitigate impact with the collision hazard, wherein the arms being inflatable and bendable; and
actuating one or more actuating units integrated with the arms of the drone to position the arms, wherein actuating the one or more actuating units flexes one or more of the arms to reposition rotor units attached to the arms to avoid damage from the collision hazard,
wherein the one or more actuating units are selectively activated by application of a voltage that induces an electromagnetic motive force to flex one or more of the arms in a defined direction according to a location and an arrangement of the one or more actuating units along a surface of the arms, including flexing upward, flexing downward, and flexing one or more of the arms to rotate.

14. The method of claim 13, wherein detecting the collision hazard includes analyzing the sensor data to identify an obstacle in a path of the drone and determining whether the drone is to impact the obstacle, the obstacle including one of an object and a surface in the surrounding environment, and
wherein determining the pose includes determining a spatial relationship between the rotor units on the arms of the drone relative to the obstacle.

15. The method of claim 13, wherein generating the controls includes identifying a collision position for the arms that reduces a likelihood of impact to the rotor units.

16. The method of claim 13, wherein generating the controls includes determining whether to flex the arms according to one or more of: upward, downward, and rotationally.

17. The method of claim 13, wherein actuating the one or more actuating units integrated with the arms includes providing an electrical signal to the one or more actuating units to induce the electromagnetic motive force that causes a magnetic moment in one or more of the arms.

18. A drone, comprising:
a body;
arms connected to the body, wherein individual ones of the arms have a first end and a second end, the first end forming a connection with the body, the arms being inflatable and bendable;
rotor units individually including a propeller attached to a motor and mounted to the second end of the individual ones of the arms;
actuator units integrated with the arms, wherein individual ones of the actuator units include electromagnetic cells that when activated induce an electromagnetic motive force; and
a control system operably connected with the actuator units and operable to selectively activate one or more of the actuator units to flex an associated one or more of the arms, wherein the electromagnetic cells are selectively activated by application of a voltage that induces the electromagnetic motive force to flex one or more of the arms in a defined direction according to a location and an arrangement of the actuator units along a surface of the arms, including flexing upward, flexing downward, and flexing one or more of the arms to rotate.

19. The drone of claim 18, wherein the control system further includes instructions that, when executed by one or more processors, cause the one or processors to selectively activate the actuator units by:
in response to detecting a collision hazard from sensor data acquired about a surrounding environment by the drone, determining a pose of the drone in relation to the collision hazard;
generating controls to position the arms of the drone to mitigate impact with the collision hazard; and
actuating one or more of the actuating units to reposition rotor units attached to the arms to avoid damage from the collision hazard.

20. The drone of claim 18, wherein the actuator units are separately integrated with the arms according to defined configurations that induce different responses by the arms, and wherein the defined configurations include at least one of: a first longitudinal configuration that when activated induce the arms to flex upward, a second longitudinal configuration that when activated induce the arms to flex downward, and a circumferential configuration that when activated induce the arms to rotate,
 wherein the control system is operable to independently control the actuator units to selectively flex the arms of the drone to induce maneuvers.

\* \* \* \* \*